Figure 1:
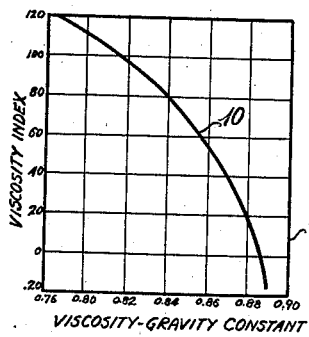

July 14, 1936.  M. R. FENSKE ET AL  2,047,363
PROCESS FOR TREATING MINERAL OILS
Filed April 13, 1934

Inventors
Merrell R. Fenske
Wilbert B. McCluer
By Hugo G. Kenman
Attorney

Patented July 14, 1936

2,047,363

UNITED STATES PATENT OFFICE 2,047,363

PROCESS FOR TREATING MINERAL OILS

Merrell R. Fenske and Wilbert B. McCluer, State College, Pa., assignors to Pennsylvania Petroleum Research Corporation, a corporation of Pennsylvania Application April 13, 1934, Serial No. 720,485

15 Claims. (Cl. 196—13)

This invention pertains generally to the separation of mineral oils into components. It will be described in connection with the improvement of lubricating stocks of Pennsylvania grade. However, it is to be understood that it may have other uses.

In accordance with this invention crude petroleum or products thereof and particularly lubricating oils are separated into various components by treatment with benzyl acetate or a mixture containing benzyl acetate in sufficient quantity to be effective as such.

While we appreciate that practically nothing is known concerning definite substances which comprise the complicated mixture known as mineral oil and still less is known concerning the compounds present in the heavier or lubricating oil fractions except that the molecular weights of the molecules are large, which makes it possible to have varying types of structure existing in the same molecule, yet there is evidence which leads to the conception that the types of molecules in lubricating oils may be divided into perhaps three classes.

The molecules of these three classes are thought to have structures containing rings and chains and the following hypothetical classification is based, first, upon whether the rings are unsaturated or saturated and second, upon the relative length of the chains attached to the rings.

The term "chain" implies either substantially a straight chain or a relatively highly branched chain.

The molecules of the first class are conceived to have rings which are appreciably unsaturated (i. e. hydrogen may be added without appreciably changing the molecular configuration) with chains attached to the rings but with the ring type of structure preponderating. Molecules of this class may be regarded as having asphaltic characteristics.

The molecules of the second class are conceived to have rings which are principally saturated, such as those of cyclopentane or cyclohexane, with a considerable number of chains attached thereto. The carbon atoms are thought to be about equally divided between the chains and the rings. Molecule of this class may be regarded as having naphthenic characteristics.

The molecules of the third class are conceived to have rings which are predominately saturated (i. e. the larger part of the carbon atoms have associated with them as many other carbon and/or hydrogen atoms as possible without appreciably changing the molecular structure) and to have chains attached to these rings which are relatively long and involved compared to the chains of the second class. The carbon atoms in the chains are thought to be materially in excess of those in the rings. This class of molecules may be regarded as having paraffinic characteristics.

It is to be understood, however, that the foregoing thoughts relative to molecular arrangements are employed simply to portray the overall or average condition of the molecular species constituting an oil and that any one or more of such molecular arrangements may comprise petroleums or oils according to the type.

Oils of Pennsylvania grade are composed preponderately of molecules of the third class.

Solvent extraction processes of the prior art relate principally to the removal of molecules of the first and second classes from oils containing considerable quantities of such molecules, such as those from the mid-continent and Western fields, the desideratum being the production of raffinates which are comparable in viscosity characteristics to Pennsylvania oils. The improvements obtained in such processes are due principally to deasphaltization, or in other words, to the removal of materials not initially contained in oils of Pennsylvania grade.

Oils of Pennsylvania grade are universally regarded as premium lubricants and improvements in such oils by the process herein are due to a considerably different effect, and entirely separate and distinct problems are involved.

Outstanding among these problems is the removal from lubricating oils of Pennsylvania grade of materials responsible for the relatively high Conradson carbon residue which is particularly characteristic of these oils. This problem is of equal if not of greater importance than that of decreasing the rate of change of viscosity with temperature.

This problem is not of equal importance in the refining of lubricating oils derived from crudes emanating from oil fields outside of the Pennsylvania area. The absence of a relatively high Conradson carbon is substantially the only characteristic in which lubricating oils derived from crudes outside of the Pennsylvania area may be regarded as being of a quality comparable to Pennsylvania grade lubricating oils.

The rate of change of viscosity with temperature is at present largely measured in terms of the "viscosity index" as developed by Dean and Davis (Chemical and Metallurgical Engineering 36,618 (1929) and revised by Davis, Lapeyrouse, and Dean (Oil Gas Journal, 30 (46), 92 (1932)).

However, we have found that the viscosity index developed according to the foregoing is unsatisfactory and inaccurate for oils of lower viscosity than 55 Saybolt seconds at 210° F. Therefore, in developing the data hereinafter we have employed the conventional method for evaluating the viscosity index of oils more viscous than 55 Saybolt seconds at 210° F. but for oils of lower viscosity we have employed the following reference basis which we find more satisfactory and accurate.

The following tabulated data are arranged in the same manner as that employed by Dean and Davis, but are based on our own experimental viscosity-temperature measurements of approximately 100 different typical Pennsylvania oils and/or their fractions.

| Viscosity (Saybolt seconds) at— | | | Difference (Saybolt seconds) L minus H |
|---|---|---|---|
| 210° F. | 100° F. | | |
| | Series L | Series H | |
| 40 | 151.1 | 110.7 | 40.4 |
| 41 | 173.4 | 123.4 | 50.0 |
| 42 | 197.2 | 136.6 | 60.6 |
| 43 | 221.6 | 150.2 | 71.4 |
| 44 | 247.7 | 164.4 | 83.3 |
| 45 | 275.0 | 179.4 | 95.6 |
| 46 | 303.3 | 194.7 | 108.6 |
| 47 | 332.1 | 210.2 | 121.9 |
| 48 | 362.3 | 226.2 | 136.1 |
| 49 | 393.0 | 242.6 | 150.4 |
| 50 | 424.5 | 259.3 | 165.2 |
| 51 | 457 | 275 | 182 |
| 52 | 491 | 291 | 200 |
| 53 | 526 | 307 | 219 |
| 54 | 560 | 323 | 237 |
| 55 | 596 | 339 | 257 |

The rate of change of viscosity with temperature is also measured in terms of a relation shown to exist between Saybolt viscosity and gravity for oils of any particular type (Hill and Coates, Industrial Engineering Chemisty 20.641 (1928)), this relationship being expressed in terms of the "viscosity gravity constant" calculated from the equation:

$$A = \frac{10G - 1.0752 \log_{10}(V-38)}{10 - \log_{10}(V-38)}$$

A = viscosity-gravity constant

G = specific gravity at 60° F.

V = viscosity at 100° F., Saybolt seconds

This relation between viscosity and gravity does not vary to any appreciable extent for oils which are produced by distillation from the same crude, but does vary for oils which are produced from different base or type crudes. Pennsylvania oils are regarded as being of high quality and for the viscosity-gravity constant give a value of approximately 0.82 whereas naphthenic oils are regarded as being of low quality and give a value of approximately 0.92.

Since the rate of change in viscosity of oil mixtures with temperature decreases with decrease in percentage of molecules of the first and second classes, it would appear that either the viscosity index or the viscosity-gravity constant is a measure of the viscosity-temperature characteristic of an oil.

However, both methods of measuring the latter characteristic present difficulties.

For instance, the viscosity index, particularly of light oil fractions, is influenced to a great extent by the accuracy with which the 210° F. viscosity is determined, and also, though to a less extent, by the accuracy with which the 100° F. viscosity is determined.

For example, an error of 1.0 Saybolt second in the 210° F. viscosity determination of a 40.0 second (Saybolt at 210° F.) oil results in an error of approximately 32 points in the viscosity index of a typical paraffinic oil, and in an error of about 55 points in the viscosity index of a typical naphthenic oil. A similar error in the case of a 45.0-second (Saybolt at 210° F.) oil results in an error of about 15 points for a paraffinic oil and in an error of 27 points for a naphthenic oil.

The influence of the accuracy of the 100° F. viscosity determination is about one-tenth of that of the 210° F. viscosity determination.

In the case of the heavier oils, the possible error due to inaccurate viscometry methods is somewhat less important but yet must be taken into consideration.

Therefore, it will be seen that very large differences in viscosity index measurements may result owing to relatively small errors in viscosity measurements, particularly in the case of light oil fractions, making it necessary to exercise a very high degree of skill and care to obtain reasonably correct readings.

A difference of a comparable character does not find its way into viscosity-gravity constant determinations in the case of light oil fractions so that the latter method may be regarded as being somewhat more accurate in the case of light oil fractions.

However, viscosity-gravity constant determinations require a much greater amount of calculations and this method is, therefore, cumbersome, particularly when investigations are made on a large scale.

Upon an investigation of a representative group of different oils, it is found that a definite relation exists between the viscosity index and the viscosity gravity constant making it possible by a combination of the two to evaluate the viscosity-temperature characteristics of an oil by a third and much more uniformly accurate and rapid method than the first and second methods respectively.

This will be more clearly understood upon reference to the drawing in which

Figure 1 is a graph on which the viscosity indexes of the above group of oils are plotted against their viscosity gravity constants.

Figure 2:
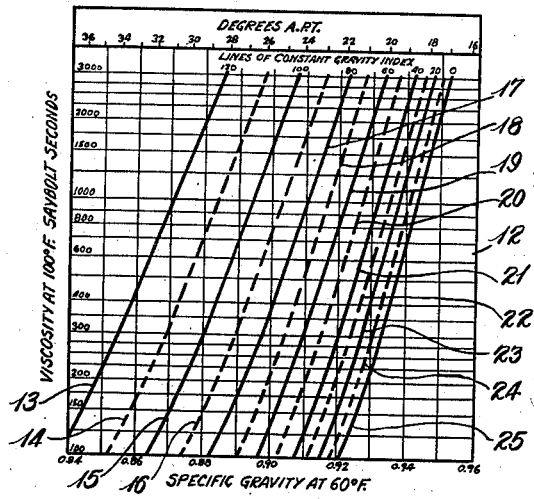
Figure 3:
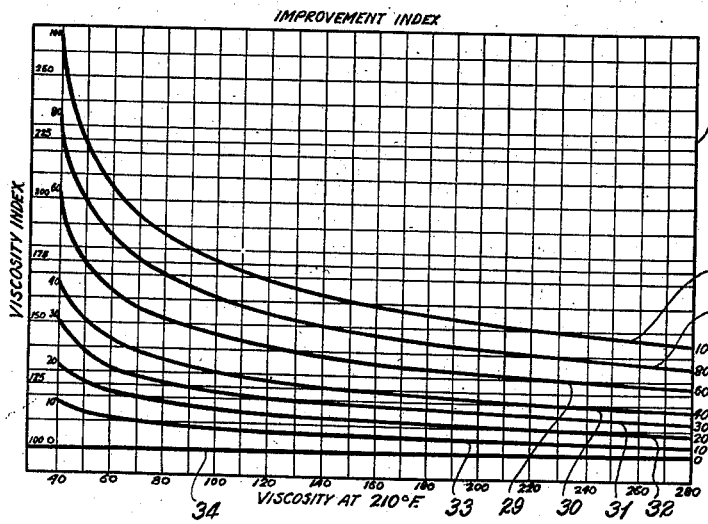

Figure 2 is a graph on which viscosities in Saybolt seconds at 100° F. are plotted against specific gravities at 60° F., the values of each having been obtained by substituting for A in the above formula the numerical value of the viscosity gravity constant (as obtained from the graph of Figure 1) corresponding to each of a series of hypothetical oils having viscosity indexes ten units apart and ranging from zero to 120; and by substituting for V in the above formula a plurality of arbitrarily chosen values; and on which graph a curve is drawn through the plotted points resulting from each chosen value of viscosity index, and Figure 3 is a graph illustrating the relative value of each unit of difference in viscosity index for oils ranging from light fractions to heavy fractions.

Referring now more particularly to Figure 1 of the drawing, the curve 10 on graph 11 shows that the viscosity gravity constant is definitely related to the viscosity index.

This fact indicates and tests have shown that an index number comparable to its viscosity index number (hereinafter referred to for convenience as the "gravity index") can be obtained for any mineral oil lubricant of any one type from its viscosity in Saybolt seconds at 100° F. and its specific gravity at 60° F. with a fairly high degree of accuracy.

Furthermore, the nature of curve 10 shows that gravity index numbers may be obtained for Pennsylvania oils (being paraffinic in type) with a high degree of precision.

A form of graph from which the gravity index of a mineral lubricating oil can be obtained accurately is shown at 12 in Figure 2. The curves 13, 14, 15, 16, 17, 18, 19, 20, 21, 22, 23, 24, and 25 were constructed by connecting all of the points plotted in the manner above indicated for each hypothetical oil. Curves 14, 16, 18, 20, 22, and 24 are shown dotted merely to assist the eye in focusing on any one line.

It is appreciated that the accuracy of such a graph is dependent to a large extent on its size, but the usual 8.5 by 11 inch plot will result in values which are approximately of the same degree of accuracy as that which corresponds to an error of 0.10° A. P. I. in gravity.

To obtain the numerical value of the gravity index for any mineral oil of the type for which graph 12 happens to be constructed whether such oil is extracted or not, it is merely necessary to measure its viscosity at 100° F. in Saybolt seconds, to measure its gravity at 60° F., and then to plot the values on graph 12 of Figure 2, interpolating the exact value if necessary. Additional curves may be interpolated between those shown if desired to assist in the reading.

This invention is based on the discovery that the gravity index, color and/or Conradson carbon of mineral oils in general and Pennsylvania grade oils in particular may be improved by treating such oils with benzyl acetate.

Oil components in general and particularly those of Pennsylvania grade possess a selective solubility in solvents of the character above set forth in that those components which are largely responsible for a relatively high viscosity change with temperature, for a relatively dark color and/or for a relatively high Conradson carbon residue are more soluble therein than other oil components not possessing these characteristics.

Therefore, by an extraction treatment of an oil containing both classes of components with the foregoing solvent, it is possible to separate said oil into an oil having a relatively higher viscosity change with temperature, a relatively darker color and/or a relatively higher Conradson carbon residue and an oil having a relatively lower viscosity change with temperature, a relatively lighter color and/or a relatively lower Conradson carbon residue than that possessed by the original oil.

Furthermore, the solvents herein set forth exhibit a selective solvent power for oxidizable components and for other components which might result in sludge, and for other substances considered deleterious, so that, when the original oil contains one or more of the foregoing, a preponderance thereof will be found in the separated portion of relatively high viscosity change with temperature, of relatively darker color and/or of relatively higher Conradson carbon residue, thereby leaving the separated portion of relatively low viscosity change with temperature, of relatively lighter color and/or of relatively lower Conradson carbon residue in a highly refined state.

In practicing the invention, contact between solvent and oil may be effected by any desired means. Two immiscible solutions will generally be eventually formed, one containing oil components of relatively higher gravity index, of relatively lighter color and/or of relatively lower Conradson carbon residue, and the other solution containing oil components of relatively lower gravity index, of relatively darker color and/or of relatively higher Conradson carbon residue.

This contact may be the result of mechanically mixing the oil with a suitable quantity of one or more of the foregoing solvents, such as by stirring in a suitable container at any desired suitable temperature to effect either a total or any desired degree of partial solution of solvent and oil. In the event of total solution of the oil and solvent, the mixing may be followed by cooling to cause the formation of two immiscible solutions the same as when partial solution only of oil in solvent is originally effected. This cooling may be in steps so as to cause fractional precipitation. It is also possible to effect partial solution of oil in solvent at a relatively elevated temperature and then to cool to precipitate a part of the dissolved oil.

Separation of the solutions may be accomplished in any manner, for instance, by allowing the liquid to settle into a two layer system and then decanting, or by centrifuging the liquid.

The solvent may be removed from each of the separated solutions by any suitable means, for instance, by distillation.

The extraction may be repeated on either separated oil portion as many times as desired.

The oil might also be treated in a batch countercurrent system wherein the solvent in batches moves countercurrently through a plurality of oil batches, each bath of solvent being separated from each batch of oil before moving on to the next batch of oil.

We find that continuous countercurrent systems are very suitable.

This is particularly true of certain continuous countercurrent systems which we have developed in which a highly efficient contact between oil and solvent is obtained (with or without precipitation or simulations of reflux) and in which channeling is substantially prevented.

However, any type of apparatus or systems may be employed without departing from the invention.

The following examples will serve to further illustrate the invention.

*Properties of Pennsylvania lubricating stocks used*

| Oil | Bright stock | Unfiltered neutral | Cylinder stock | Blend of cylinder stock and unfiltered neutral |
|---|---|---|---|---|
| Viscosity at 210° F | 153 | 45.15 | 154.4 | 88.8 |
| Viscosity at 100° F | 2517 | 182.6 | 2370 | 960 |
| Gravity, ° A. P. I. | 25.9 | 29.7 | 25.9 | 27.5 |
| Flash point, ° F | 550 | 420 | 565 | 475 |
| Fire point, ° F | 620 | 490 | 635 | 530 |
| Pour point, ° F | 15 | 0 | 50 | 30 |
| Percent Conradson carbon | 1.728 | 0.027 | 2.178 | 1.444 |
| Color (A. S. T. M.) | 8 | 5½ | 23.6-D | 34.5-D |
| Viscosity index | 97.0 | 99.0 | 102.0 | 100.5 |
| Viscosity gravity constant | 0.809 | 0.824 | 0.810 | 0.812 |
| Gravity index | 106 | 95 | 105 | 104 |

The following runs were made with benzyl acetate as the solvent and bright stock as the oil.

The letter R appearing after the run number at the head of a column of figures indicates that the figures of the respective column relate to the properties of the raffinate of the run. Likewise, the letter E following the run number at the head of a column of figures indicates that the figures of the column relate to the properties of the extract.

*Extraction of bright stock*

| Run number | 1R | 2R | 3R | 4R | 4E |
|---|---|---|---|---|---|
| Solvent-oil volume ratio | 16.5:1 | 2:1 | 5:1 | 9:1 | |
| Extraction temperature ° F | 32 | 77 | 77 | 77 | |
| Yield of raffinate | 65 | 68 | 73 | 58 | |
| Yield of extract | 35 | 14 | 27 | 42 | |
| Viscosity at 210° F | 154.4 | 149.5 | 152.8 | 162.4 | 154.7 |
| Viscosity at 100° F | 2145 | 2220 | 2195 | 2328 | 3571 |
| Gravity, ° A. P. I. | 28.5 | 27.0 | 27.7 | 28.1 | 20.9 |
| Flash point, ° F | | | | 555 | |
| Fire point, ° F | | | | 625 | |
| Pour point, ° F | | | | 20 | |
| Percent Conradson carbon | | | | 1.006 | 3.879 |
| Color (A. S. T. M. and/or cms.) | 56.2-8 | 57.6-7¾ | 55.9-8 | 54.1-8¼ | |
| Viscosity index | 109.0 | 102.0 | 105.5 | 107.5 | 72.5 |
| Viscosity-gravity constant | 0.789 | 0.802 | 0.796 | 0.729 | 0.848 |
| Gravity index | 117 | 111 | 114 | 115 | 72 |

*Extraction of bright stock—Continued*

| Run number | 5R | 5E | 6R | 7R | 8R |
|---|---|---|---|---|---|
| Solvent-oil volume ratio | 17.5:1 | | 1:1 | 3:1 | 9:1 |
| Extraction temperature ° F | 77 | | 122 | 122 | 122 |
| Yield of raffinate | 47 | | 84 | 60 | 30 |
| Yield of extract | 53 | | 16 | 40 | 70 |
| Viscosity at 210° F | 185.8 | 135.2 | 153.8 | 163.0 | 215.4 |
| Viscosity at 100° F | 2760 | 2550 | 2405 | 2448 | 3375 |
| Gravity, ° A. P. I. | 28.1 | 22.4 | 26.35 | 27.25 | 27.8 |
| Flash point, ° F | | | | | |
| Fire point, ° F | | | | | |
| Pour point, ° F | | | | | |
| Percent Conradson carbon | | | | | |
| Color (A. S. T. M. and/or cms.) | 52.9-8¼ | | 52.0-8¼ | 55.4-8 | 48.6 |
| Viscosity index | 109.5 | 77.5 | 100.5 | 105.0 | 109.5 |
| Viscosity-gravity constant | 0.788 | 0.840 | 0.805 | 0.798 | 0.787 |
| Gravity index | 118 | 80 | 109 | 112 | 119 |

The following runs were made with benzyl acetate as the solvent and unfiltered neutral as the oil.

*Extraction of unfiltered neutral*

| Run number | 9R | 10R | 11R | 12R |
|---|---|---|---|---|
| Solvent-oil volume ratio | 1:1 | 3:1 | 6:1 | 16:1 |
| Extraction temperature, ° F | 32 | 32 | 32 | 32 |
| Yield of raffinate | 88 | 69 | 64 | 20 |
| Yield of extract | 12 | 31 | 36 | 80 |
| Viscosity at 210° F | 44.5 | 43.8 | 43.3 | 43.05 |
| Viscosity at 100° F | 170.9 | 156.2 | 145.0 | 137.0 |
| Gravity, ° A. P. I. | 31.3 | 32.6 | 33.4 | 34.75 |
| Flash point, ° F | | | | |
| Fire point, ° F | | | | |
| Pour point, ° F | | | | |
| Percent Conradson carbon | | | | |
| Color (A. S. T. M. and/or cms.) | 92.8-2¾ | 96.1-2 | 97.0-1¾ | 96.8-1¾ |
| Viscosity index | 101 | 103 | 112 | 118 |
| Viscosity-gravity constant | 0.814 | 0.806 | 0.803 | 0.795 |
| Gravity index | 102 | 107 | 110 | 114 |

*Extraction of unfiltered neutral—Continued*

| Run number | 13R | 14R | 14E | 15R |
|---|---|---|---|---|
| Solvent-oil volume ratio | 1:1 | 2:1 | | 4:1 |
| Extraction temperature ° F | 77 | 77 | | 77 |
| Yield of raffinate | 84 | 56 | | 24 |
| Yield of extract | 16 | 44 | | 76 |
| Viscosity at 210° F | 43.45 | 43.6 | 52.8 | 43.6 |
| Viscosity at 100° F | 155.2 | 152.7 | 361.1 | 150.6 |
| Gravity, ° A. P. I. | 30.3 | 31.8 | 24.2 | 33.0 |
| Flash point, ° F | | | | |
| Fire point, ° F | | | | |
| Pour point, ° F | | 0 | | |
| Percent Conradson carbon | | | | |
| Color (A. S. T. M. and/or cms.) | 89.6-3½ | 92.5-2¾ | | 96.1-2 |
| Viscosity index | 102 | 107 | 73 | 110 |
| Viscosity-gravity constant | 0.822 | 0.812 | 0.853 | 0.804 |
| Gravity index | 95 | 103 | 65 | 109 |

The following runs were made with benzyl acetate as the solvent and cylinder stock as the oil.

*Extraction of cylinder stock*

| Run number | 16R | 17R | 17E | 18R | 19R | 20R | 21R |
|---|---|---|---|---|---|---|---|
| Solvent-oil vol. ratio | 5:1 | 18:1 | | 2:1 | 5:1 | 18:1 | 4:1 |
| Extraction temp. °F | 32 | 32 | | 77 | 77 | 77 | 122 |
| Yield of raffinate | 87 | 70 | | 97 | 75 | 52 | 58 |
| Yield of extract | 13 | 30 | | 3 | 25 | 48 | 42 |
| Viscosity at 210° F | 145.9 | 149.4 | 214 | 147.6 | 147.8 | 171.1 | 163 |
| Viscosity at 130° F | 786 | 784 | | 811 | 796 | 922 | 892 |
| Viscosity at 100° F | 1970* | 1935* | 6705 | 2070* | 1970* | 2240* | 2205* |
| Gravity, °A. P. I. | 27.4 | 28.1 | 19.4 | 26.8 | 27.4 | 27.8 | 27.3 |
| Flash point, °F | | | | | | | |
| Fire point, °F | | | | | | | |
| Pour point, °F | | 80 | | | | 50 | 70 |
| Percent Conradson carbon | | | | | | 1.250 | |
| Color (A. S. T. M. and/or cms.) | 25.2-D | 23.2-D | | 27.9-D | 32.4-D | 22.5-D | 26.2-D |
| Viscosity index | 108 | 110 | 65 | 106 | 109 | 113 | 110 |
| Viscosity-gravity constant | 0.801 | 0.796 | 0.853 | 0.805 | 0.800 | 0.795 | 0.799 |
| Gravity index | 111 | 114 | 66 | 109 | 112 | 114 | 111 |

Note: Asterisks denote extrapolated viscosities.

The following runs were made with benzyl acetate as the solvent and a blend of cylinder stock and unfiltered neutral as the oil.

*Extraction of blend of cylinder stock and unfiltered neutral*

| Run number | 22R | 23R | 24R |
|---|---|---|---|
| Solvent-oil volume ratio | 1:1 | 6:1 | 12:1 |
| Extraction temperature °F | 77 | 77 | 77 |
| Yield of raffinate | 84 | 57 | 40 |
| Yield of extract | 16 | 43 | 60 |
| Viscosity at 210° F | 88.8 | 101.8 | 119.8 |
| Viscosity at 130° F | 391.5 | 451.5 | 566 |
| Viscosity at 100° F | 920* | 1050* | 1310* |
| Gravity °A. P. I. | 27.4 | 28.7 | 28.8 |
| Flash point, °F | | | |
| Fire point, °F | | | |
| Pour point, °F | | | |
| Percent Conradson carbon | | 1.010 | |
| Color (A. S. T. M. and/or cms.) | 36.5-D | 33.1-D | 29.1-D |
| Viscosity index | 104 | 111 | 114 |
| Viscosity-gravity constant | 0.813 | 0.803 | 0.799 |
| Gravity index | 105 | 111 | 114 |

Note: Asterisks denote extrapolated viscosities.

In all of the foregoing runs, contact between solvent and oil was made by single batch methods. Greater efficiencies may be obtained by employing more efficient methods, for instance, continuous counter-current.

A substance or substances might be added to the solvent to reduce or otherwise modify the solubility of hydrocarbons therein if desired.

In the foregoing data with respect to color the smaller numerals show the color as measured by A. S. T. M. methods.

The larger numerals, which are referred to as indicating centimeters, show a relative relationship with 100 centimeters indicating the color of a water-white oil and 0 centimeters an oil sufficiently opaque to cut down the quantity of light transmitted with the light source 0 centimeters away to the same quantity as would pass through the water-white oil with the light source 100 centimeters away.

An increase in centimeters, therefore, indicates improvement in color.

In some cases the products obtained were too dark for determination on this specially constructed colorimeter in the usual manner. In this case the oils were diluted with kerosene. The kerosene used for dilution had a color rating of 90 centimeters. Accordingly all colors reported for these darker products were obtained on kerosense-oil mixtures containing 85% by volume kerosense and 15% by volume oil. The readings so obtained are listed with the suffix "D".

The degree of actual improvement in the oils of the above runs will be better appreciated upon reference to Figure 3 wherein is shown a graph 26 having curves 27, 28, 29, 30, 31, 32 and 33. Curve 27 was constructed by plotting the viscosity indexes of a series of hypothetical oils against their viscosities in Saybolt seconds at 210° F. Each of the series of hypothetical oils was assumed to have no viscosity difference between 100° F. and 210° F. The curve 27, therefore, represents the maximum improvement that can be hoped for as far as the viscosity-temperature characteristics of an oil is concerned.

It will be noted that the curve 27 slopes downwardly toward the right, the slopes at the various points on the curve 27 being quite extreme at the left and becoming less extreme at the right, but there is nevertheless, a decided downward tendency. This is due to the manner in which the viscosity index was originally developed and clearly shows that a difference of one point in the viscosity index of an oil of, for instance, 280 seconds viscosity at 210° F. is of as much importance as a difference of about 3.5 points in the viscosity index of an oil having a viscosity of, for instance, 40 seconds at 210° F.

The curves 27 to 33 inclusive have been interpolated to represent different percentages of improvement in viscosity index over that normally possessed by a Pennsylvania grade oil. Base line 34 is given a value of 100 since Pennsylvania oils are rated at 100 in viscosity index. Curve 33 represents an improvement of 10%; curve 32, 20%; curve 31, 30%; curve 30, 40%; curve 29, 60%; and curve 28, 80%.

From the foregoing it will be seen that a mineral oil and particularly one of Pennsylvania grade may be divided into any desired number of portions having different gravity indexes, having different color ratings and/or having different Conradson carbon residue ratings and may be simultaneously otherwise refined.

Since it is much more difficult to improve a petroleum oil of Pennsylvania grade due to its original high quality and since such oils may be very substantially improved by the process herein, it follows that the process will effect very substantial improvements in other oils such as those of naphthenic and/or asphaltic characteristics.

In the claims, the term "lubricating oil" when referred to is intended to mean an oil of a viscous character, that is, of the order of 40 Saybolt seconds at 210° F. or above.

While procedure for the purpose of carrying out the invention has been particularly described, it is to be understood that this is by way of illustration, and that changes, omissions, additions, substitutions, and/or modifications may be made without departing from the spirit of the invention which is intended to be limited only as required by the prior art.

We claim:

1. A process comprising contacting a mineral oil containing components of different characteristics with benzyl acetate under conditions causing the formation of two phases to produce portions of said oil respectively exhibiting certain of said characteristics to a greater and to a less degree.

2. A process comprising contacting a mineral oil containing components of different gravity index with benzyl acetate under conditions causing the formation of two phases to produce portions of said oil respectively of higher and lower gravity index.

3. A process comprising contacting a mineral oil containing components of different color with benzyl acetate under conditions causing the formation of two phases to produce portions of said oil respectively of lighter and darker color.

4. A process comprising contacting a mineral oil containing components responsible for Conradson carbon residue with benzyl acetate under conditions causing the formation of two phases to produce portions of said oil respectively of higher and lower concentrations of said components.

5. A process comprising contacting a petroleum oil of Pennsylvania grade containing components of different characteristics with benzyl acetate under conditions causing the formation of two phases to produce portions of said oil respectively exhibiting certain of said characteristics to a greater and to a less degree.

6. A process comprising contacting a petroleum oil of Pennsylvania grade containing components of different gravity index with benzyl acetate under conditions causing the formation of two phases to produce portions of said oil respectively of higher and lower gravity index.

7. A process comprising contacting a petroleum oil of Pennsylvania grade containing components of different color with benzyl acetate under conditions causing the formation of two phases to produce portions of said oil respectively of lighter and darker color.

8. A process comprising contacting a petroleum oil of Pennsylvania grade containing components responsible for Conradson carbon residue with benzyl acetate under conditions causing the formation of two phases to produce portions of said oil respectively of higher and lower concentrations of said components.

9. A process comprising contacting a lubricating oil of Pennsylvania grade containing components of different characteristics with a benzyl acetate under conditions causing the formation of two phases to produce portions of said oil respectively exhibiting certain of said characteristics to a greater and to a less degree.

10. A process comprising contacting a lubricating oil of Pennsylvania grade with benzyl acetate under conditions causing the formation of two phases to produce portions of said oil respectively of higher and lower gravity index.

11. A process comprising contacting a lubricating oil of Pennsylvania grade with benzyl acetate under conditions causing the formation of two phases to produce portions of said oil respectively of darker and lighter color.

12. A process comprising contacting a lubricating oil of Pennsylvania grade with benzyl acetate under conditions causing the formation of two phases to produce portions of said oil respectively of higher and lower concentrations in components responsible for Conradson carbon residue.

13. A process comprising contacting a petroleum oil with benzyl acetate under conditions conducive to the formation of two liquid phases, and separating said phases to produce oil portions of higher and lower gravity index, said petroleum oil being of a character such that the raffinate portion will have a viscosity index above 100.

14. A process comprising contacting a lubricating oil fraction of Pennsylvania grade with benzyl acetate under conditions conducive to the formation of two liquid phases, separating said phases, said original oil fraction being of a character such that the raffinate produced will have a viscosity at 210° F. at least substantially as high as the viscosity at 210° F. of the original oil.

15. A lubricating oil having a viscosity gravity constant at least as low as 0.80 and resulting from the solvent treatment of a lubricating oil of Pennsylvania grade with benzyl acetate.

MERRELL R. FENSKE.
WILBERT B. McCLUER.